May 15, 1923.

R. POPE 1,455,305

MEANS FOR CONTROLLING THE REBOUND OF SPRINGS OF VEHICLES

Filed March 7, 1922

Inventor-
Richard Pope
By B. Singer
Atty

Patented May 15, 1923.

1,455,305

UNITED STATES PATENT OFFICE.

RICHARD POPE, OF NORTH SYDNEY, NEW SOUTH WALES, AUSTRALIA.

MEANS FOR CONTROLLING THE REBOUND OF SPRINGS OF VEHICLES.

Application filed March 7, 1922. Serial No. 541,638.

*To all whom it may concern:*

Be it known that I, RICHARD POPE, a subject of the King of Great Britain, residing at North Sydney, in the State of New South Wales, Australia, have invented certain new and Improved Means for Controlling the Rebound of Springs of Vehicles, of which the following is a specification.

This invention has been devised for the purpose of checking the rebound of vehicle springs under shocks conveyed through the road wheels while running at considerable speeds. The invention is mainly applicable to motor vehicles in which, when such a shock is received upon the springs, the resulting rebound of the body is immediately communicated to the occupants of the car.

It is an object of this invention to avoid the unpleasant consequences of road shocks by the provision of means that will momentarily hold the vehicle body after it has descended upon the springs and to release it gradually to normality, say in a space of time equal to about that occupied by two revolutions of the driving wheels.

I have described a construction suitable for this purpose in my United States specification Number 464,540 in which there are two sets of governing means, one being utilized for the driving wheels and the other for controlling the shocks received upon the front wheels of the car.

In my present invention it is proposed to control both the front and rear wheel springs from free wheel clutches mounted near to the tail shaft and driven from a worm upon the same, the clutches being operated through flexible connections attached to the vehicle chassis or other part.

The invention is illustrated in the accompanying drawings, in which

Figure 3 is a plan of the same and showing the clutches and means for throwing same out of gear, while

Figure 1:
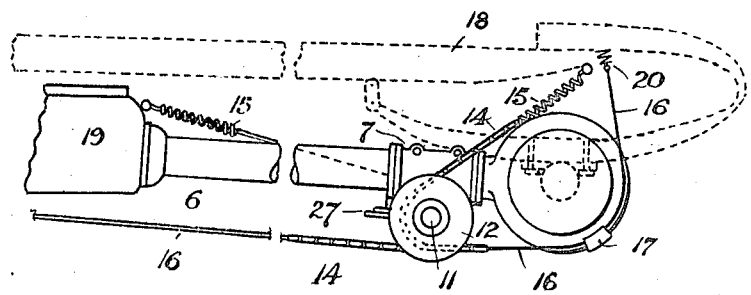
Figure 1 shows the gear box and connections in longitudinal elevation.

The tail shaft 5 is fitted with a housing 6 in which a bearing 7 is provided to support the shaft, on which is a worm 8. The housing may continue over the worm to the differential casing, which is as ordinarily constructed. Upon the housing is a compartment 9 that contains a worm wheel 10 upon a driven spindle 11 and in mesh with worm 8. The spindle turns with the worm wheel and mounted on the spindle at each side the tail shaft is a clutch 12, of the well known free wheel type. On the inside or free member of each clutch and bolted thereto is a sprocket wheel 13 on each of which is a sprocket chain 14. These chains are connected at one end to a tension spring 15 and at the other to a belt 16. One of the clutches 12 and its connections is to control the rear springs, for which purpose its spring 15 is connected to the vehicle chassis while the strap 16 is likewise attached to the chassis or other point in the car. Preferably, the strap is passed around the differential casing in frictional contact therewith, and to keep it in place a pair of lugs 17 is placed on the said casing to guide the strap.

The spring 15 is such that it will be always in tension whatever the relative positions of the chassis and axle. When a shock is received by the rear wheels the axle will approach the chassis 18 and the belt and chain 14 will be slackened. This will at once be taken up by the spring 15 which, in reacting, will turn the sprocket wheel 13 that, as before stated, is upon the freely moving member of the clutch. When this inner member turns with the sprocket the effect will be to lock the clutch and the car body will be held momentarily with the springs and be prevented from rebounding away from the axle. As the road wheels continue to revolve the clutch will be again freed, say in a space of time taken by the wheels making two revolutions at a high rate of speed. As the clutch is freed the vehicle springs react to gradually return the chassis and body thereon to the normal, without perceptible shock to the occupants.

To govern the movements of the body over the front springs the clutch upon the opposite side of the tail shaft is employed, together with a sprocket wheel, chain and spring 15 and belt 16. In this case the spring can be attached to the gear casing 19 and the belt to the front axle or other convenient place. In the case of the control of the rebound of the front springs the same actions occur under shock to the springs, when the axle and the chassis approach under shock the chain 14 slackens and the spring 15 reacts to take up the slack and to turn the sprocket wheel, thus locking the clutch.

At the chassis end of the rear belt 16, I may interpose a compression spring 20 about a bolt 21, the spring seating upon the chassis or an extension or hanger therefrom. This spring is intended to reduce the wear and tear upon the main gear and cushions the small shocks as same occur under running conditions.

Figure 2:
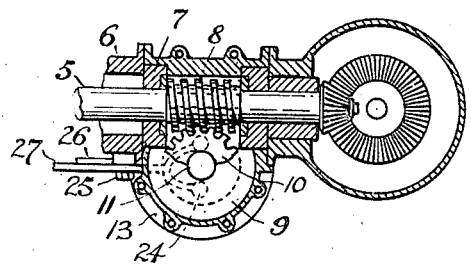
Figure 2 is a side sectional elevation of the same attached into the tail shaft housing or sleeve near the differential casing.
Figure 3:
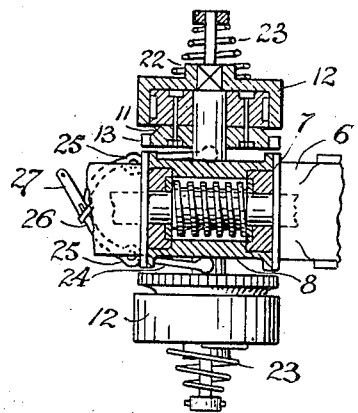
Figure 4:
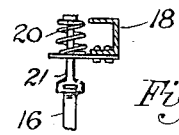
Figure 4 is a detail of an auxiliary cushioning spring for taking up the smaller shocks.

To provide for moving the vehicle in reverse gear, means are provided for cutting out the clutches when the engine transmission gear is put into reverse. The outer member of each of the clutches is for this purpose mounted over a square or hexagon 22 formed on the spindle 11 which keys the clutch member but permits of same, when required, being moved laterally against the cushioning spring 23, that is held upon an extension from the spindle 11. If a sideways pressure be exerted against the sprockets 13 both clutches can be moved laterally out of gear with spindle 11. For this purpose the device illustrated in Figures 2 and 3 is provided and wherein forked members 24 embrace the spindle at each side the tail shaft, said members being pivotally mounted at 25. Beyond the said pivotal connections, the members are integral with extensions forming a bow 26 in two parts, one part being slidably attached to the other part, which extends to a lever 27, that will be suitably connected to the gearbox control lever in the automobile; whenever this control lever is moved to bring the reverse into gear, the intermediate levers will be disposed to push the lever 27 backwards, thus rocking the forked members 24 outwards on their fulcrums to push the clutches out of gear. On the control lever being moved into position to give a forward movement to the car the members 24 will return to their first positions and the springs 23 will react to push the clutch members on to the spindle 11.

Thus, both the forward and rear springs will be controlled from one point on the tail shaft through the worm thereon, but it will be evident that an amelioration of the discomfort at present experienced by the occupants of the back seat of automobiles, when passing over rough roads, will be effected by the use of one of the sets described, whereby the sudden reaction of the rear springs will be prevented.

Having now described my invention what I claim as new and desire to secure by Letters Patent is—

1. In a rebound control gear for motor vehicles, in combination, a worm upon the tail shaft, a worm wheel in mesh therewith on a spindle disposed transversely to the shaft, a free wheel clutch on each end of said spindle and means for closing each clutch, on the occurrence of rebound, one through flexible connections with the front part of the car and the other through like connections with the rear part.

2. In a rebound control gear for motor vehicles, in combination, a worm upon the tail shaft, a worm wheel in mesh therewith upon a transverse spindle, a free wheel clutch on the spindle on each side the worm, a sprocket wheel upon the freely moving member of each clutch, a chain over each sprocket, a tension spring between one end of each chain and a point on the vehicle chassis said chains being held at their other ends to some convenient part of the vehicle.

3. In a rebound control gear for motor vehicles, in combination, a worm upon the tail shaft, a worm wheel in mesh therewith upon a transverse spindle, a free wheel clutch on the spindle on each side the worm, a sprockekt wheel upon the freely moving member of each clutch, a chain over each sprocket, a tension spring between one end of each chain and a point on the vehicle chassis said chains being held at their other ends to the chassis or other convenient part, the rearwardly operating chain being attached to a friction belt passing around the differential housing in frictional contact therewith and a floating spring between the other end of the belt and the chassis.

4. In a rebound control gear, in combination, a housing about the tail shaft of a motor vehicle, a bearing therein supporting the shaft, a worm on the shaft, a worm wheel in mesh with the worm upon a driven spindle disposed transversely to the shaft, a free wheel clutch on the spindle at each side the shaft, a sprocket wheel on the inner member of each clutch, a chain over said sprocket, a tension spring attached at one end to each chain and at the other end to the car, the other end of the chains being held at other points in the car, as specified.

In testimony whereof I affix my signature.

RICHARD POPE.